(12) United States Patent
Zhang et al.

(10) Patent No.: US 9,903,937 B2
(45) Date of Patent: Feb. 27, 2018

(54) USING KNOWN GEOGRAPHICAL INFORMATION IN DIRECTIONAL WIRELESS COMMUNICATION SYSTEMS

(71) Applicant: QUALCOMM Incorporated, San Diego, CA (US)

(72) Inventors: Zhenliang Zhang, Somerset, NJ (US); Sundar Subramanian, Bridgewater, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 14/601,820

(22) Filed: Jan. 21, 2015

(65) Prior Publication Data

US 2016/0047884 A1 Feb. 18, 2016

Related U.S. Application Data

(60) Provisional application No. 62/038,564, filed on Aug. 18, 2014.

(51) Int. Cl.
*H04W 24/00* (2009.01)
*G01S 5/02* (2010.01)
(Continued)

(52) U.S. Cl.
CPC .............. *G01S 5/0284* (2013.01); *G01S 3/74* (2013.01); *G01S 5/0294* (2013.01);
(Continued)

(58) Field of Classification Search
None
See application file for complete search history.

(56) References Cited

U.S. PATENT DOCUMENTS

| 6,993,361 B2 | 1/2006 | Chitrapu |
| 7,657,288 B2 * | 2/2010 | Chitrapu ............... H01Q 1/246 455/524 |

(Continued)

FOREIGN PATENT DOCUMENTS

| DE | 20309955 U1 | 12/2003 |
| WO | WO-2006105316 A2 | 10/2006 |

(Continued)

OTHER PUBLICATIONS

ISA/EPO, International Search Report and Written Opinion of the International Searching Authority, Int'l Appl. No. PCT/US2015/041173, dated Oct. 14, 2015, European Patent Office, Rijswijk, NL, 10 pgs.

(Continued)

*Primary Examiner* — Erika Washington
(74) *Attorney, Agent, or Firm* — Liem T. Do

(57) ABSTRACT

Methods, systems, and apparatuses are described for using known geographical information in directional wireless communication systems. In some aspects, an estimated position of a receiver relative to a transmitter may be determined based at least in part on known geographical information, and a desired beam direction for wireless communication from the transmitter to the receiver may be searched for based at least in part on the estimated position of the receiver.

30 Claims, 14 Drawing Sheets

(51) Int. Cl.
  *H04W 64/00*    (2009.01)
  *G01S 3/74*     (2006.01)
  *H04B 7/06*     (2006.01)
  *H04B 7/08*     (2006.01)

(52) U.S. Cl.
  CPC ........ *H04B 7/0617* (2013.01); *H04W 64/003* (2013.01); *H04B 7/0834* (2013.01)

(56)          References Cited

U.S. PATENT DOCUMENTS

| | | |
|---|---|---|
| 2003/0181163 A1 | 9/2003 | Ofuji et al. |
| 2004/0174298 A1* | 9/2004 | Eriksson ............... H01Q 1/246 342/359 |
| 2006/0239238 A1* | 10/2006 | Fernandez-Corbaton H04B 7/01 370/342 |
| 2010/0124212 A1 | 5/2010 | Lo |
| 2013/0189929 A1 | 7/2013 | Takahashi et al. |
| 2013/0223251 A1* | 8/2013 | Li ..................... H04W 72/046 370/252 |

FOREIGN PATENT DOCUMENTS

WO    WO-2012158046 A2    11/2012
WO    WO 2013097187 A1     7/2013

OTHER PUBLICATIONS

Stevens T., et al., "Network Localization for Distributed Transmit Beam Forming with Mobile Radios," IEEE International Conference on Acoustics, Speech and Signal Processing (ICASSP), Mar. 2012, pp. 5217-5220.

* cited by examiner

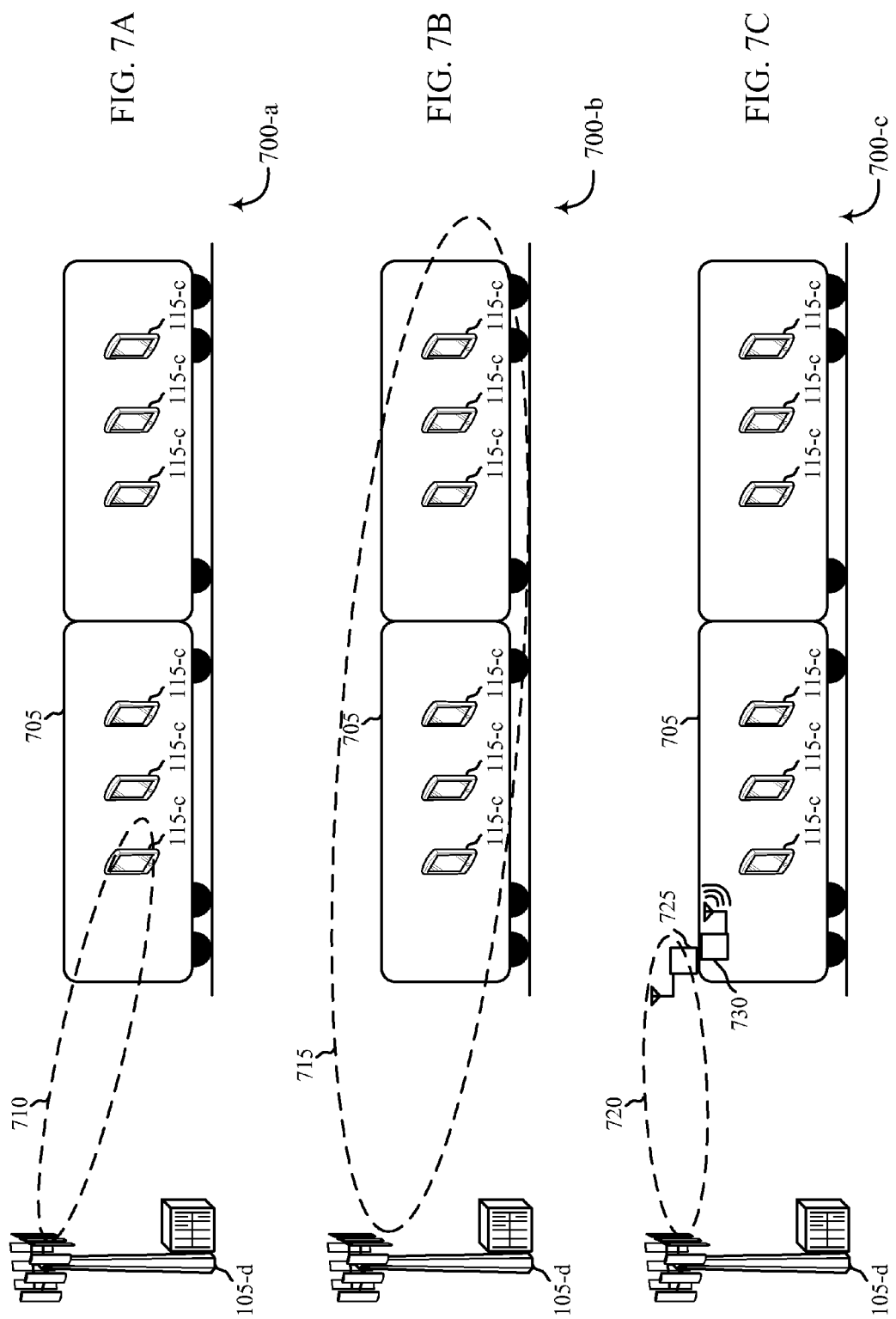

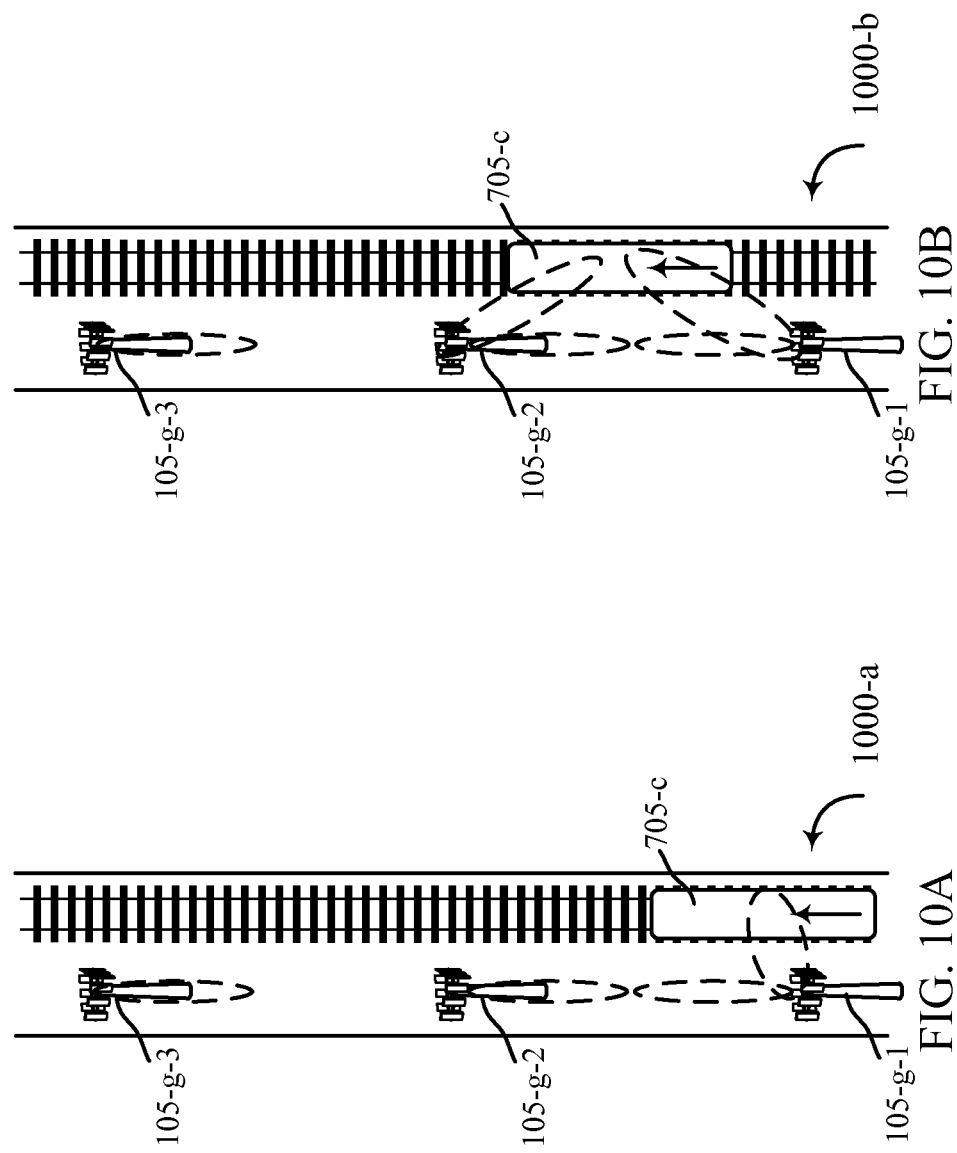

USING KNOWN GEOGRAPHICAL INFORMATION IN DIRECTIONAL WIRELESS COMMUNICATION SYSTEMS

The present Application for Patent claims priority to U.S. Provisional Patent Application No. 62/038,564 by Zhang et al., entitled "Using Known Geographical Information In Directional Wireless Communication Systems," filed Aug. 18, 2014, assigned to the assignee hereof.

BACKGROUND

Field of the Disclosure

The present disclosure, for example, relates to wireless communication systems, and more particularly to using known geographical information in directional wireless communications.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink (DL) channels (e.g., for transmissions from a base station to a UE) and uplink (UL) channels (e.g., for transmissions from a UE to a base station).

A wireless multiple-access communication system may use any of a number of different frequency bands depending on the particular needs of the system. For example, in some systems, a large number of UEs may be located relatively close to one another (e.g., in a public transportation passenger train). The millimeter wave frequency band (which may be 20 to 300 GHz) may be used in these situations with a concentration of UEs because of the relatively large amount of bandwidth that is available in this frequency band. Millimeter waves, however, frequently experience high path loss, and as a result, directional beam forming techniques may be used for UL and/or DL transmissions between a base station and a UE.

In order to utilize directional beam forming, the base station and/or the UE may need to search for and track the desired beam direction. Searching and tracking the desired beam direction over an entire 360-degree field, however, can consume large amounts of frequency and time resources.

SUMMARY

The described features generally relate to one or more improved systems, methods, and/or apparatuses for using geographical information in wireless communication systems. A transmitter, a receiver, and/or a core network may use known geographical information to simplify beam searching, beam tracking, and handover processes. For example, a base station may use a known trajectory of a passenger train to constrain the field of search for a desired beam for use in directional communications using millimeter wave technology. As another example, a UE receiver may use a known geographical location of a base station, together with its own determined geographical location as a starting point for a beam search for directional communications with the base station. By limiting the scope of beam searching and beam tracking, and simplifying the handover between different transmitters, time and frequency resources that would otherwise be used for comprehensive beam searching and tracking may be available for other purposes.

A method for wireless communication is thus described, with the method including determining an estimated position of a receiver relative to a transmitter based at least in part on known geographical information, and searching for a desired beam direction for wireless communication from the transmitter to the receiver based at least in part on the estimated position of the receiver.

Also, an apparatus for wireless communication is described, with the apparatus including means for determining an estimated position of a receiver relative to a transmitter based at least in part on known geographical information, and means for searching for a desired beam direction for wireless communication from the transmitter to the receiver based at least in part on the estimated position of the receiver.

Also, another apparatus for wireless communication is described, with the apparatus including a processor, a memory in electronic communication with the processor, and instructions stored in the memory, with the instructions being executable by the processor to determine an estimated position of a receiver relative to a transmitter based at least in part on known geographical information, and search for a desired beam direction for wireless communication from the transmitter to the receiver based at least in part on the estimated position of the receiver.

Also, a non-transitory computer-readable medium for wireless communication in a wireless device is described, the non-transitory computer-readable medium storing computer-executable code for determining an estimated position of a receiver relative to a transmitter based at least in part on known geographical information, and searching for a desired beam direction for wireless communication from the transmitter to the receiver based at least in part on the estimated position of the receiver.

In some examples of the method, apparatuses, and/or computer-readable medium, the searching for the desired beam direction may be constrained based at least in part on the estimated position of the receiver. Also, an estimated location of the transmitter relative to the receiver may be determined based at least in part on the known geographical information, and a second desired beam direction for wireless communication from the receiver to the transmitter may be searched for based at least in part on the estimated location of the transmitter. One or more of the transmitter, the receiver, or a core network may determine the estimated position, and/or determine an initial beam direction and an initial beam range for use in the searching based at least in part on the known geographical information. Also, the determination of the estimated position and/or the determination of the initial beam direction and initial beam range may be constrained based at least in part on the known geographical information. For example, the determination of the initial beam direction may be constrained to a predetermined subset of possible directions.

In some examples, the desired beam direction may be tracked as a function of time during the wireless communication based at least in part on the known geographical information. The estimated position of the receiver may be a first estimated position of the receiver at a first, current time, and the tracking the desired beam direction may include determining a second estimated position of the receiver at a second, future time based at least in part on a current velocity of the receiver, a current position of the receiver, and a known trajectory of the receiver. The known trajectory of the receiver may be estimated based at least in part on historical information, and the historical information may include actual movement of other receivers during previous time periods. The known trajectory of the receiver may also or alternatively be estimated based at least in part on known geographical features.

In some examples, the transmitter may be a first transmitter, and the wireless communication may be handed-over from the first transmitter to a second transmitter utilizing the known geographical information. The desired beam direction may be a first desired beam direction associated with the first transmitter, and the handing-over of the wireless communication may include listening, at the second transmitter, for a wake up signal from the first transmitter along a receive beam direction associated with a known position of the first transmitter relative to the second transmitter, and receiving, from the first transmitter, the wake up signal and information regarding the receiver, the wake up signal and information regarding the receiver being sent by the first transmitter to the second transmitter along a transmit beam direction associated with a known position of the second transmitter relative to the first transmitter. Further, the handing-over may include searching for a second desired beam direction associated with the second transmitter based at least in part on the information regarding the receiver received from the first transmitter. The information regarding the receiver may include one or more of an identification number of the receiver, a current position of the receiver, a current velocity of the receiver, a suggested beam search direction, or a handoff time, and the information regarding the second transmitter may include one or more of an identification number of the second transmitter, a known location of the second transmitter, or the handoff time. Buffered data from the first transmitter may be transmitted to the second transmitter for delivery to the receiver.

In some examples, the known geographical information may include one or more of a current location of the receiver, a current velocity of the receiver, current channel measurements by the receiver, historical information, or a known trajectory of the receiver. The wireless communication may include uplink and/or downlink transmissions, and may be in a millimeter wave frequency band. The transmitter may be a base station, and the receiver may be a user equipment (UE) or a relay module, and the receiver may move during the wireless communication. Alternatively or additionally, the transmitter may be a user equipment (UE) or a relay module, and the receiver may be a base station. In some examples, the receiver may be one of a group of receivers, and the estimated position may be determined for the collective group of receivers relative to the transmitter.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 7A-7C illustrate several embodiments of beam forming for use in wireless communication, in accordance with various aspects of the present disclosure;

FIGS. 10A-10D illustrate an embodiment of handing-over wireless communication with a receiver between two transmitters based at least in part on known geographical information, in accordance with various aspects of the present disclosure;

DETAILED DESCRIPTION

Features generally relating to using known geographical information in directional wireless communication systems are disclosed. As described in more detail below, an estimated position of a receiver relative to a transmitter (or of the transmitter relative to the receiver) may be determined based at least in part on known geographical information, such as the known location and velocity of the receiver, a known trajectory of the receiver, historical information regarding the movement of the receiver, channel measurements between the transmitter and receiver, and so forth. The estimated position of the receiver may then be used to constrain the search for a desired beam direction for directional wireless communications in, for example, the millimeter wave frequency band. Furthermore, the estimated position of the receiver may be updated and/or future estimated positions of the receiver may be determined based on the known geographical information, and these updated/future estimated positions may be used to simplify a beam tracking process. Also, in some embodiments, the known geographical information may help a handover of communication with a receiver between two different transmitters— for example, the transmitters may communicate with each other to signal an upcoming handover opportunity, to exchange information on the current and likely future positions of the receiver, and to handover the wireless communications based on the exchanged information.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
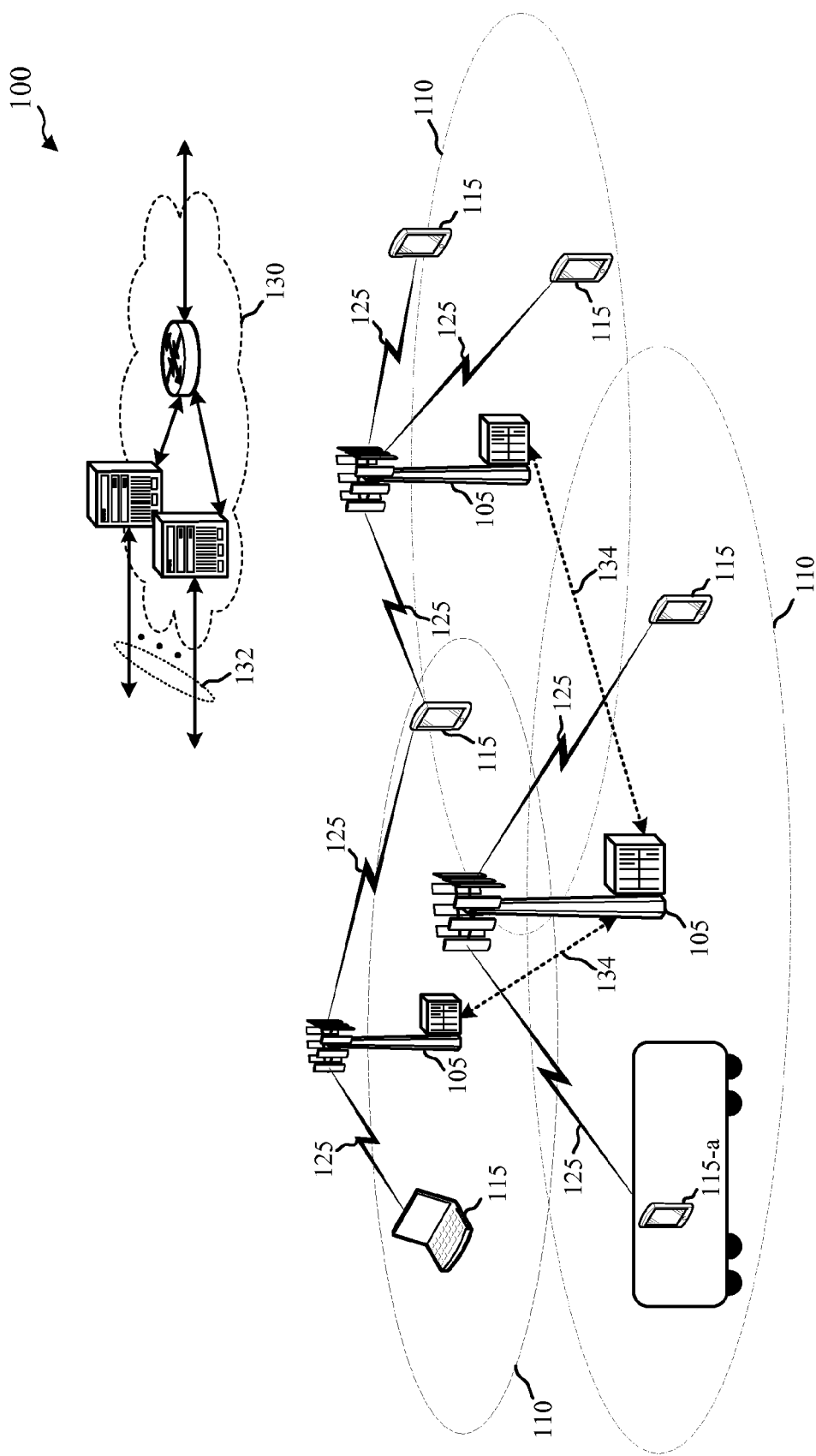
FIG. 1 shows a block diagram of a wireless communication system, in accordance with various aspects of the present disclosure.

FIG. 1 illustrates an example of a wireless communication system 100 in accordance with various aspects of the disclosure. The wireless communication system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro and/or small cell base stations). There may be overlapping geographic coverage areas 110 for different technologies.

In some examples, the wireless communication system 100 is an LTE/LTE-A network. In LTE/LTE-A networks, the term eNB may be generally used to describe the base stations 105, while the term UE may be generally used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context. In other embodiments, the wireless communication system 100 includes one or more millimeter wave base stations 105, a combination of LTE and millimeter wave base stations 105, or any other type of base station 105.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communication system 100, and each UE 115 may be stationary or mobile (i.e., may move during the course of one or more wireless communication sessions with the base stations 105). A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communication system 100 may include uplink (UL) transmissions from a UE 115 to a base station 105, and/or downlink (DL) transmissions, from a base station 105 to a UE 115. In this manner, both UEs 115 and base stations 105 are both transmitters and receivers, depending on whether UL or DL communications are taking place. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplexing (FDD) (e.g., using paired spectrum resources) or time division duplexing (TDD) operation (e.g., using unpaired spectrum resources). Frame structures for FDD (e.g., frame structure type 1) and TDD (e.g., frame structure type 2) may be defined.

In some embodiments of the wireless communication system 100, base stations 105 and/or UEs 115 may include multiple antennas for employing antenna diversity schemes to improve communication quality and reliability between base stations 105 and UEs 115. Additionally or alternatively, the base stations 105 and/or UEs 115 may include multiple antennas for employing beam forming techniques, allowing directional communications using the array of antennas. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some embodiments, at least some of the base stations 105 may be configured to communicate with UEs 115 in the millimeter wave frequency band as mentioned above. In one example illustrated in FIG. 1, a UE 115-a may be in use within a passenger train, such as a public transportation light rail or subway system. While not shown in FIG. 1 for simplicity, the passenger train may actually include dozens or even hundreds of passengers, each of whom may employ one or more UEs. This dense concentration of UEs in a relatively small geographic boundary may demand a relatively large amount of bandwidth, and as such, directional wireless communications may be used to service the UEs as described above. In some embodiments, directional millimeter wave communications may be employed, whereas in other embodiments, other radio access technologies (RATs) may be employed, such as LTE/LTE-A.

Figure 2:
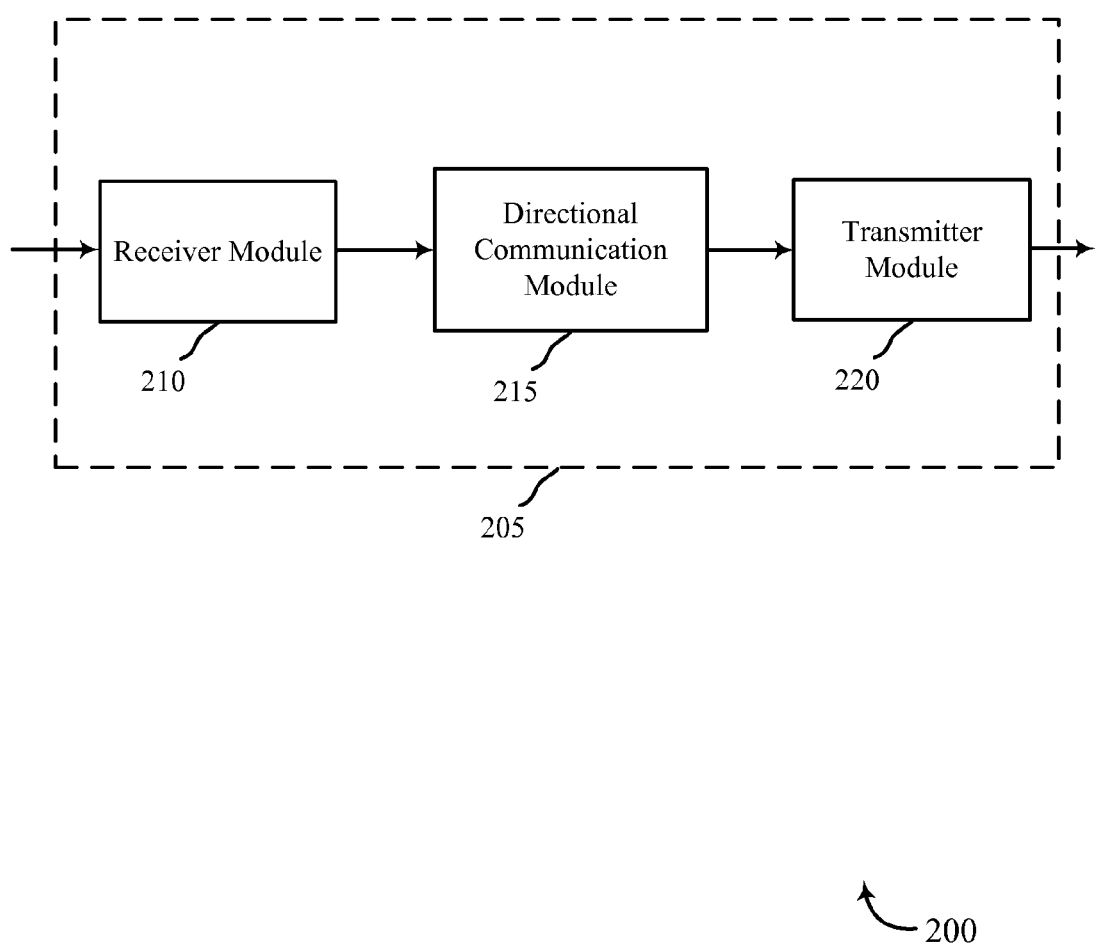
FIG. 2 shows a block diagram of a device configured for use in wireless communication, in accordance with various aspects of the present disclosure.

FIG. 2 shows a block diagram 200 of a device 205 for use in wireless communication, in accordance with various aspects of the present disclosure. The device 205 may be an example of one or more aspects of a UE 115 described above with reference to FIG. 1 and/or an example of one or more aspects of a base station 105 described above with reference to FIG. 1 and/or an example of one or more aspects of the core network 130 described above with reference to FIG. 1. In other embodiments, the device 205 may be a relay module installed on a passenger train, as explained in more detail below with reference to FIG. 7C. The device 205 may include a receiver module 210, a directional communication module 215, and/or a transmitter module 220. The device 205 may also include a processor (not shown). Each of these modules may be in communication with each other.

The components of the device 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 210 may receive information such as packets, user data, and/or control information associated with various information channels (e.g., control channels, data channels, etc.). If the device 205 is a UE 115, the receiver module 210 may be configured to wirelessly receive user data and control signaling from a base station 105. The control signaling may include geographical data relating to the base station 105, handover information, and so forth. When the device 205 is a UE 115, the receiver module 210 may also be configured to receive geographical information about the device 205 itself—for example, the receiver module 210 may receive the position and velocity of the device 205 from a global positioning system (GPS) associated with the device 205 (not shown in FIG. 2). The receiver module 210 may also receive historical information, known trajectory of a path that the device 205 is on, and so forth.

If the device 205 is a base station 105, the receiver module 210 may be configured to receive user data from the core network 130 in FIG. 1 to be passed on to UEs 115. The receiver module 210 may also be configured to receive geographical information about the UEs, including, for example, their known locations, velocities, trajectories, and so forth.

Information received by the receiver module 210 of the device 205 may be passed on to the directional communication module 215, and to other components of the device

205. The directional communication module 215 may be configured to determine an estimated position of a receiver (e.g., a UE 115) relative to a transmitter (e.g., a base station 105) based at least in part on known geographical information (which may be received by receiver module 210), and further configured to cause the device 205 to search for a desired beam direction (and optionally a desired beam width) for wireless communication from the transmitter to the receiver based at least in part on the estimated position of the receiver. The directional communication module 215 may use the estimated position of the receiver and/or the known geographical information to constrain the searching for the desired beam direction (and/or desired beam width) in some embodiments—that is, the estimated position and/or the known geographical information may reduce the number of directions that need to be search such that less than a 360-degree sweep is performed. In some embodiments, a much more limited searching sweep is used—for example, a sweep in 1, 2, 5, 10, 15, 20, 30, 45, 60, 90, 135, or 180 degrees.

In one example, the device 205 is a base station transmitter, and a UE 115 is a receiver wirelessly coupled with the base station 105, and, as such, the directional communication module 215 determines the estimated position of receiver/UE 115 relative to the transmitter/base station 105 based at least in part on the known geographical information, and searches for a DL transmission beam from the transmitter/base station 105 to the receiver/UE 115 based at least in part on the estimated position of the UE 115 and/or the known geographical information. Further, an estimated location of the transmitter/base station 105 relative to the receiver/UE 115 may also be determined based at least in part on the known geographical information, and a second desired beam direction for UL wireless communications from the receiver/UE 115 to the transmitter/base station 105 may be searched for based at least in part on the relative position of the transmitter/base station 105 and/or the known geographical information. It will be appreciated that in this example, the transmitter receives data from the receiver, and the receiver transmits data to the transmitter—and thus transmitter and receiver are merely used here to refer to specific devices 205.

In addition to being used to search for the desired DL transmission beam from the transmitter/base station 105 to the receiver/UE 115 and for the desired UL transmission beam from the receiver/UE 115 to the transmitter/base station 105, the respective relative positions of the transmitter/base station 105 and the receiver/UE 115 and/or the known geographical information may be used to search for a DL receive direction along which the receiver/UE 115 should receive the DL transmissions from the transmitter/base station 105 and also for an UL receive direction along which the transmitter/base station 105 should receive the UL transmissions from the receiver/UE 115.

Referring still to the directional communication module 215 in FIG. 2, it may also be configured to track a desired beam direction (and optionally beam width) as a function of time during a wireless communication based at least in part on known geographical information, and/or may be configured to facilitate the handover of wireless communication between two transmitters utilizing the known geographical information, as described in more detail below.

Returning to FIG. 2, the transmitter module 220 may transmit one or more signals received from other components of the device 205. For example, if the device 205 is a base station 105, the transmitter module 220 may transmit DL user data received from the core network 130 to one or more UEs 115. If the device 205 is a UE 115, the transmitter module 220 may transmit UL user data to the base station 105. The DL and UL communications may be transmitted using beam forming techniques, where the direction of the beam used for the transmissions is based on the searching for the desired beam performed by the directional communication module 215. In some examples, the transmitter module 220 may be collocated with the receiver module 210 in a transceiver module.

As mentioned above, in some embodiments, the device 205 in FIG. 2 may be a relay module installed on a passenger train for use as an intermediary between one or more base stations 105 and one or more UEs 115. A relay module may be used, for example, if the wireless communication transmissions are unable to penetrate the metal and glass enclosure of the passenger train. In this case, one portion of the relay module positioned external to the passenger train may be wirelessly coupled with one or more base stations 105, a second portion of the relay module positioned within the passenger train may be wirelessly coupled with one or more UEs 115, and the first and second portions of the relay module may be coupled together via one or more wires that penetrate the shell of the passenger train.

Figure 3:
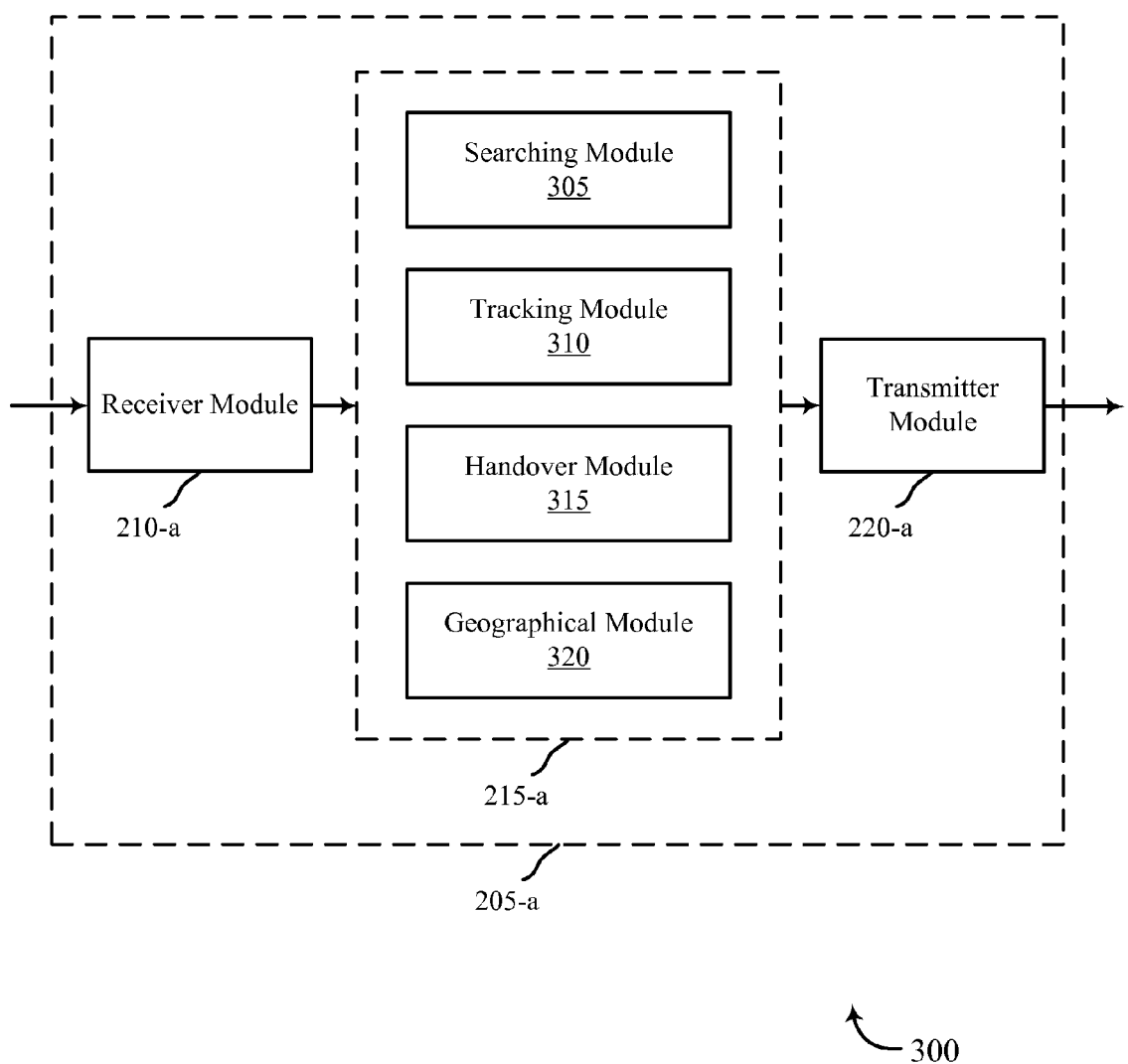
FIG. 3 shows a block diagram of a device configured for use in wireless communication, in accordance with various aspects of the present disclosure.

FIG. 3 shows a block diagram 300 of a device 205-*a* for use in wireless communication, in accordance with various examples. The device 205-*a* may be an example of one or more aspects of the device 205 described with reference to FIG. 2. The device 205-*a* may include a receiver module 210-*a*, a directional communication module 215-*a*, and/or a transmitter module 220-*a*, which may be examples of the corresponding modules of device 205. The device 205-*a* may also include a processor (not shown). Each of these components may be in communication with each other. The directional communication module 215-*a* may include a searching module 305, a tracking module 310, a handover module 315, and a geographical module 320. The receiver module 210-*a* and the transmitter module 220-*a* may perform the functions of the receiver module 210 and the transmitter module 220, of FIG. 2, respectively.

The searching module 305 of the directional communication module 215-*a* in FIG. 3 may be configured to search for a desired beam direction (and optionally a desired beam width) for directional wireless communication based at least in part on an estimated position of a transmitter and/or receiver relative to one another and/or based at least in part on known geographical information, as described above. The searching module 305 may, for example, constrain the search for the desired beam using an initial beam search direction and an initial beam search range, which may in turn be based on the estimated position(s) and/or known geographical information. In some embodiments, the desired beam width and/or the initial beam search range may be determined based on the known geographical information and/or estimated position(s), whereas in other embodiments, the desired beam width may be based on a certainty regarding the known geographical information and/or the estimated position(s). Based on the searching for the desired beam direction, the transmitter module 220-*a* may steer a DL/UL transmission beam for directional wireless communication with a receiver/transmitter—for example may define the beam forming angle to be used for the UL and or DL transmissions with the receiver.

The tracking module 310 of the directional communication module 215-*a* in FIG. 3 may be configured to track a desired beam direction for directional wireless communications based at least in part on known geographical information. Based on the tracking of the desired beam direction, the transmitter module 220-*a* may steer a DL/UL transmission beam for directional wireless communication with a receiver/transmitter—for example, may change the beam forming angle as a function of time.

The handover module 315 of the directional communication module 215-*a* in FIG. 3 may be configured to handover a wireless communication with a receiver from a first transmitter to a second transmitter utilizing the known geographical information.

The geographical module 320 of the directional communication module 215-*a* in FIG. 3 may be configured to receive, generate, process, store, or transmit known geographical information, such as the a current location (e.g., GPS coordinates, longitude and latitude, etc.) of one or more receivers and/or one or more transmitters, a current velocity (including direction of travel) of one or more receivers, current channel measurements by one or more receivers of a respective wireless link, historical information regarding one or more receivers and/or one or more base stations, a known or likely trajectory of one or more receivers, and so forth. In some embodiments, the geographical information is self-reported by receivers and/or transmitters to or within the wireless communication system 100, whereas in other embodiments, the geographical information is derived from other sources. For example, historical information regarding passenger train schedules, speeds, stops, and so forth may be used to derive a predicted location, speed, and so forth of one or more receivers that are positioned on the passenger train.

Figure 4:
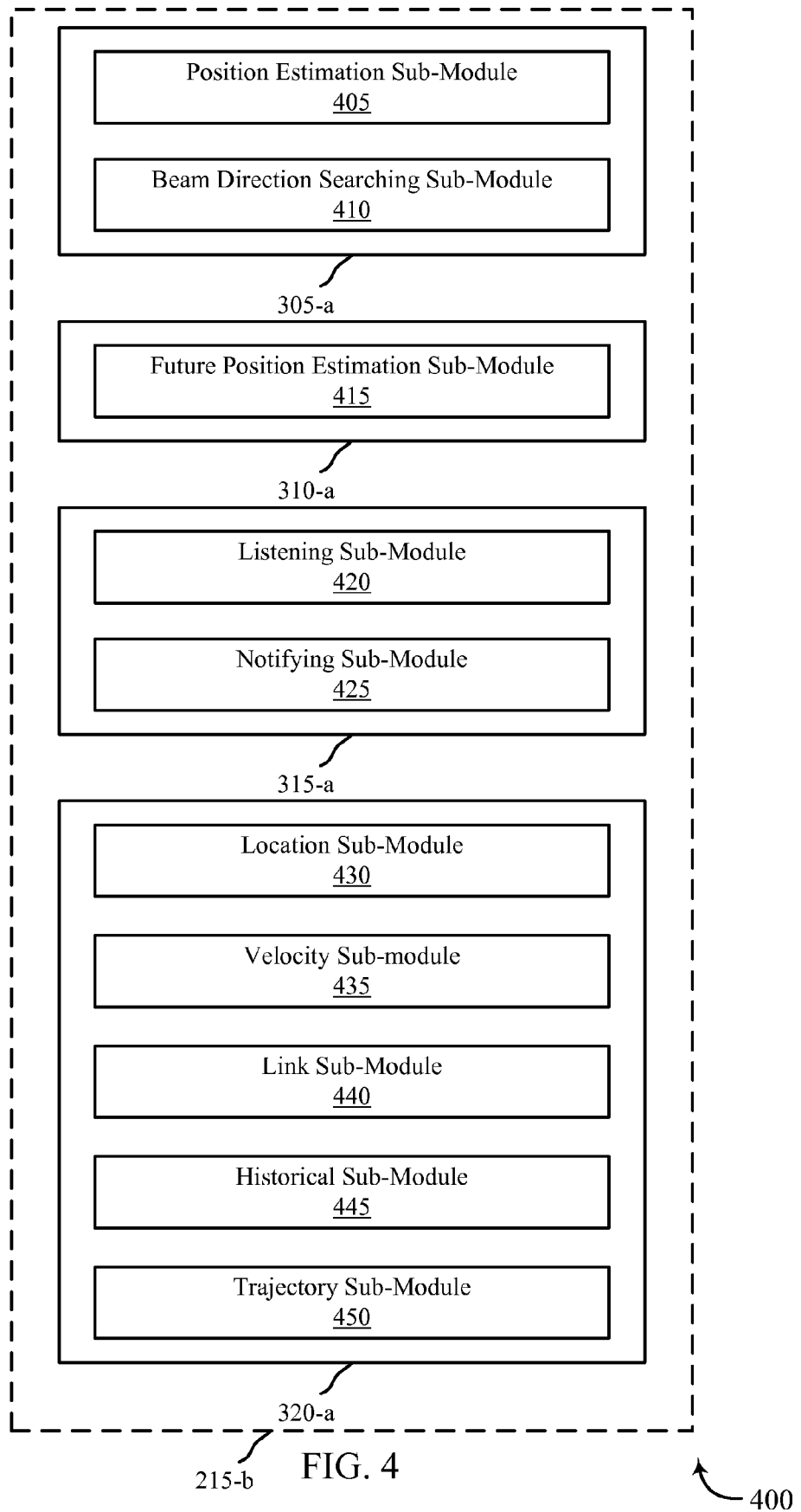
FIG. 4 shows a block diagram of a directional communication module configured for use in wireless communication, in accordance with various aspects of the present disclosure.

FIG. 4 shows a block diagram 400 of a directional communication module 215-*b* for use in wireless communication, in accordance with various examples. The directional communication module 215-*b* may be an example of one or more aspects of the directional communication modules 215 described above with reference to FIGS. 2 and 3. The directional communication module 215-*a* may include a searching module 305-*a*, a tracking module 310-*a*, a handover module 315-*a*, and a geographical module 320-*a*, which may be examples of the corresponding modules of device 205-*a* in FIG. 2.

The searching module 305-*a* in FIG. 4 includes a position estimation sub-module 405 and a beam direction searching sub-module 410. The position estimation sub-module 405 may be configured to determine an estimated position of a receiver relative to a transmitter and/or an estimated position of the transmitter relative to the receiver, both based at least in part on known geographical information as described herein. The estimation position determined by the position estimation sub-module 405 may in some embodiments correspond to an individual UE 115/receiver, whereas in other embodiments, the estimated position may correspond to a collective group of UEs 115/receivers (e.g., the estimated position may correspond to an envelope of UEs 115/receivers) relative to a transmitter, or vice versa. In still other embodiments, the estimated position may correspond to a relay module—for example in the case of a passenger train, as described above.

The beam direction searching module 410 may be configured to search for a desired beam direction (e.g., for receiving and/or transmitting DL and/or UL transmissions) based at least in part on the estimated position(s) from the position estimation sub-module 405 and/or known geographical information. In some embodiments, the search for the desired beam direction may be based at least in part on the estimated position(s) and/or the known geographical information in that the search for the desired beam direction is constrained by the estimated position(s) and/or the known geographical information. For example, the search for the desired beam direction may begin with an initial beam search direction corresponding to the estimated position(s), and may be constrained to an initial beam range for use in the searching based on a certainty of the estimated position. As another example, the search for the desired beam direction may be constrained to a predetermined subset of possible directions based on the estimated position(s) and/or the known geographical information.

The tracking module 310-*a* in FIG. 4 includes a future position estimation sub-module 415, which may be configured to track the desired beam direction (that is originally obtained from the beam direction searching sub-module 410 described above) as a function of time by determining a second, future estimated position of the receiver at a second, future time based at least in part on, for example, a current velocity of the receiver, a current position of the receiver, a known trajectory of the receiver, and so forth. The future position estimation sub-module thus accommodates receiver movement during the course of wireless communication between a transmitter and the receiver. In some embodiments, the known trajectory of the receiver is estimated based at least in part on historical information (e.g., movement of other receivers during previous time periods), whereas in other embodiments the known trajectory of the receiver is estimated based on known locations of tracks for a passenger train, known highway infrastructure (for receivers located in vehicles), and so forth.

The handover module 315-*a* in FIG. 4 includes a listening sub-module 420 and a notifying sub-module 425. The listening sub-module 420, when implemented in a second transmitter, may be configured to listen for wake up signals from first, sending transmitter along, for example, a receive beam direction associated with a known position of the second transmitter relative to the first transmitter. The listening sub-module 420 may also be configured to receive, from the first transmitter, the wake up signal and information regarding a receiver (e.g., one or more of an identification number of the receiver, a current position of the receiver, a current velocity of the receiver, a suggested beam search direction, a handoff time, etc.) along a transmit beam direction associated with a known position of the second transmitter relative to the first transmitter.

Continuing with the example with first and second transmitters, the notifying sub-module 425 may be implemented in the first transmitter, and may be configured to transmit the wake up signal and information regarding the receiver to the second transmitter, as described above. The notifying sub-module 425 may also be configured to transmit a notifying signal to the receiver with information regarding the second transmitter (e.g., one or more of an identification number of the second transmitter, a known location of the second transmitter, the handoff time, etc.). In some embodiments, the notifying sub-module 425 may also be configured to buffer data to be transmitted to the receiver, and to transmit the buffered data to the second transmitter for final delivery to the receiver.

While the above example has described an embodiment in which the listening module 420 is implemented in a second transmitter, a receiver may also include a listening module 420. When a listening module 420 is implemented in a receiver, it may be configured to respond to and accept synchronization information received from the first transmitter (e.g., by sending back a random access channel (RACH) signal with information such as current location, identification number, and so forth).

The geographical module 320-a in FIG. 4 includes a location sub-module 430, a velocity sub-module 435, a link sub-module 440, a historical sub-module 445, and a trajectory sub-module 450. The location sub-module 430 may be configured to receive, generate, process, store, or transmit one or more current locations associated with one or more transmitters and/or receivers. The velocity sub-module 435 may be configured to receive, generate, process, store, or transmit current velocities (including direction of travel) associated with one or more transmitters and/or receivers. The link sub-module 440 may be configured to receive, generate, process, store, or transmit channel measurement information from one or more transmitters and/or receivers. The historical sub-module 445 may be configured to receive, generate, process, store, or transmit historical data regarding movement, traffic demands, and so forth regarding one or more transmitters and/or receivers. The trajectory sub-module 450 may be configured to receive, generate, process, store, or transmit trajectory information (e.g., the typical paths taken by one or more transmitters and/or receivers). The information received, generated, processed, or stored in the various sub-modules 430, 435, 440, 445, 450 of the geographical module 320-a may be used by the other components of the directional communication module 215-b shown in FIG. 4 to carry out their respective functionalities.

Figure 5:
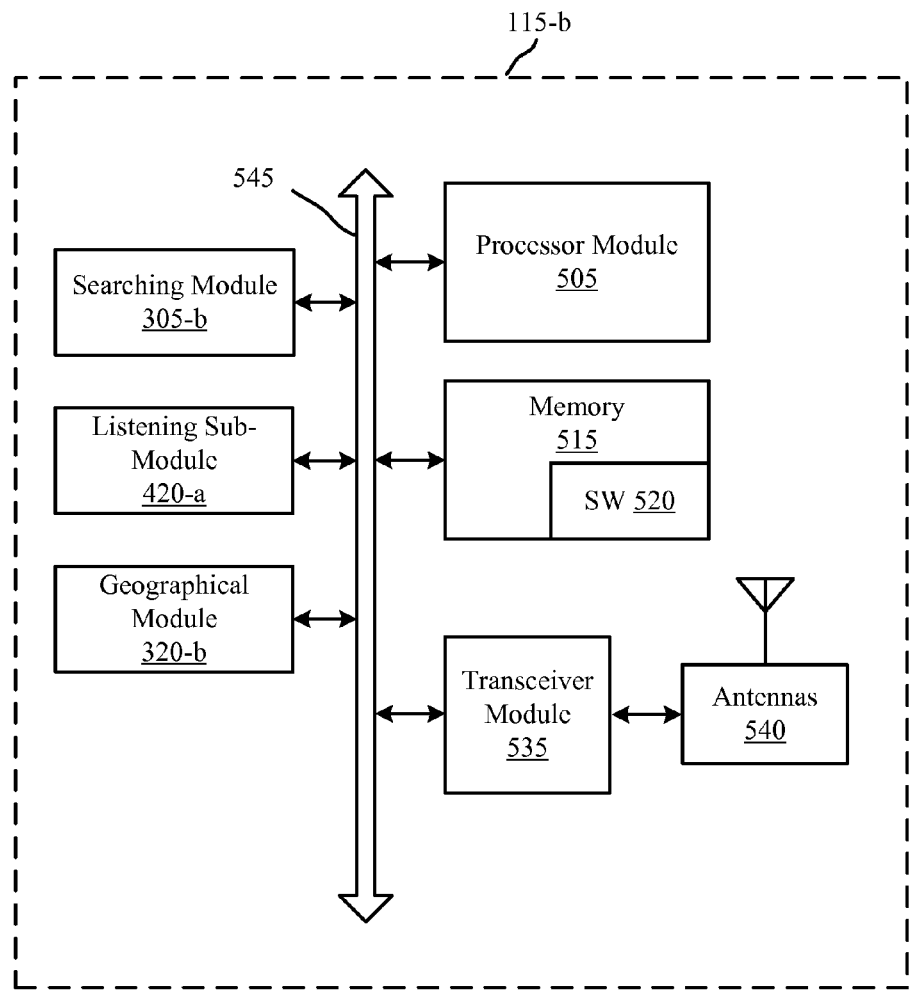
FIG. 5 shows a block diagram of an apparatus for use in wireless communication, in accordance with various aspects of the present disclosure.

FIG. 5 shows a block diagram 500 of an apparatus for use in wireless communication, in accordance with various examples. The apparatus shown in FIG. 5 may be a UE 115-b, which may be an example of the UEs 115, 115-a of FIG. 1. UE 115-b may also be an example of one or more aspects of devices 205 of FIGS. 2 and 3. As described above, UE 115-b acts as a receiver when receiving DL transmissions from a base station 105, and acts as a transmitter when sending UL transmissions to the base station 105.

The UE 115-b may generally include components for bi-directional voice and data communications including components for transmitting communications and components for receiving communications. The UE 115-b may include antenna(s) 540, a transceiver module 535, a processor module 505, and memory 515 (including software (SW) 520), which each may communicate, directly or indirectly, with each other (e.g., via one or more buses 545). The transceiver module 535 may be configured to communicate bi-directionally, via the antenna(s) 540 and/or one or more wired or wireless links, with one or more networks, as described above. For example, the transceiver module 535 may be configured to communicate bi-directionally with base stations 105. The transceiver module 535 may include a modem configured to modulate the packets and provide the modulated packets to the antenna(s) 540 for transmission, and to demodulate packets received from the antenna(s) 540. While the UE 115-b may include a single antenna 540, the UE 115-b may have multiple antennas 540 capable of concurrently transmitting and/or receiving multiple wireless transmissions. The transceiver module 535 may be capable of concurrently communicating with one or more base stations 105 via multiple component carriers.

The UE 115-b may include a searching module 305-b, which may perform the functions described above for the searching modules 305, 305-a. The UE 115-b also includes a listening sub-module 420-a, which may perform the functions described above for the listening module 420. Also, the UE 115-b includes a geographical module 320-b, which may perform the functions described above for the geographical modules 320, 320-a.

The memory 515 may include random access memory (RAM) and read-only memory (ROM). The memory 515 may store computer-readable, computer-executable software/firmware code 520 containing instructions that are configured to, when executed, cause the processor module 505 to perform various functions described herein. Alternatively, the computer-readable, computer-executable software/firmware code 520 may not be directly executable by the processor module 505 but be configured to cause a computer (e.g., when compiled and executed) to perform functions described herein. The processor module 505 may include an intelligent hardware device, e.g., a central processing unit (CPU), a microcontroller, an application-specific integrated circuit (ASIC), etc.

Figure 6:
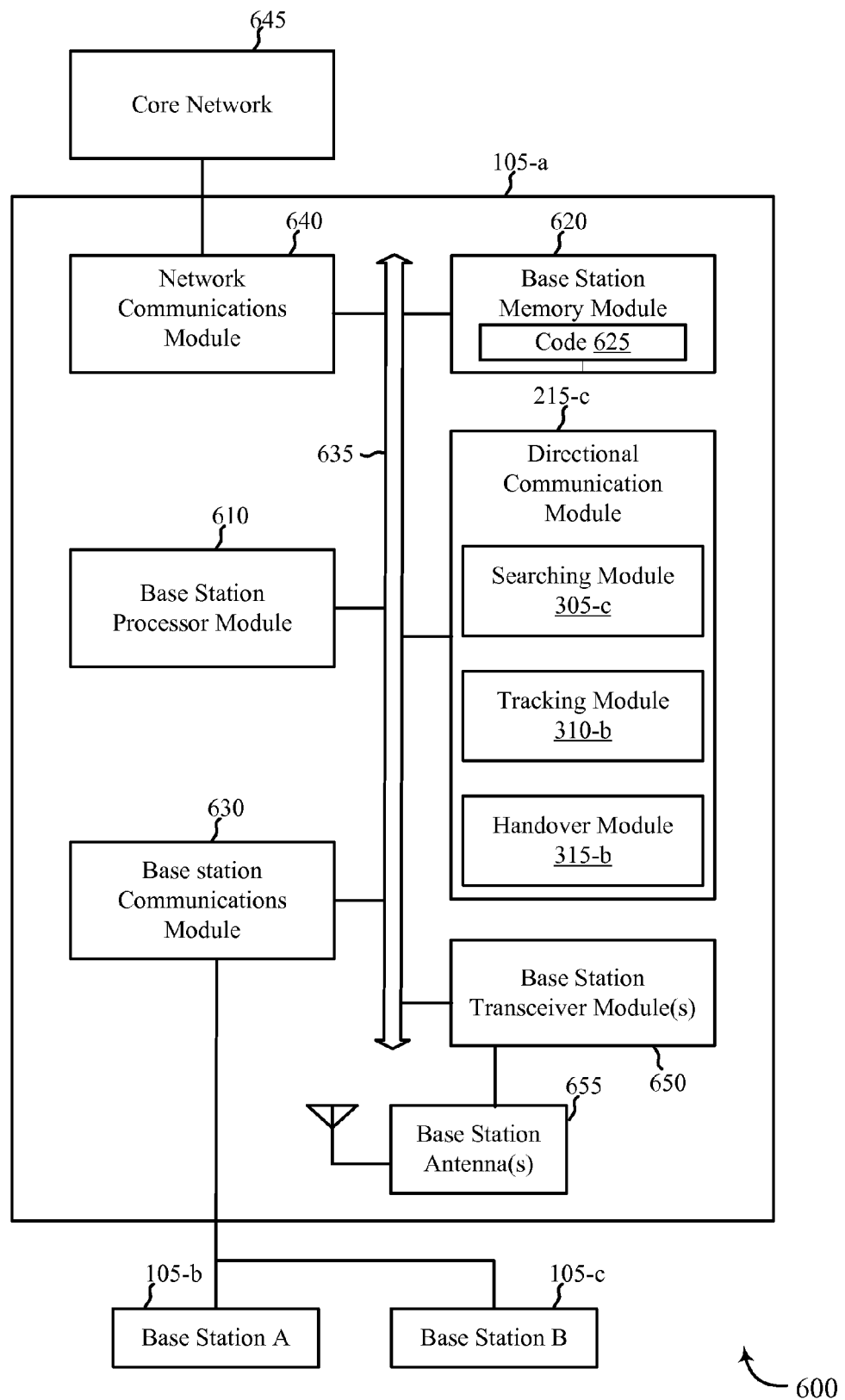
FIG. 6 shows a block diagram of an apparatus for use in wireless communication, in accordance with various aspects of the present disclosure.

FIG. 6 shows a block diagram 600 of a base station 105-a for use in wireless communication, in accordance with various aspects of the present disclosure. In some examples, the base station 105-a may be an example of aspects of one or more of the base stations 105 described above, and/or aspects of one or more of the devices 205 when configured as a base station, as described above with reference to FIGS. 2 through 4.

The base station 105-a may include a base station processor module 610, a base station memory module 620, at least one base station transceiver module (represented by base station transceiver module(s) 650), at least one base station antenna (represented by base station antenna(s) 655), and/or a directional communication module 215-c. The base station 105-a may also include one or more of a base station communications module 630 and/or a network communications module 640. Each of these modules may be in communication with each other, directly or indirectly, over one or more buses 635.

The base station memory module 620 may include random access memory (RAM) and/or read-only memory (ROM). The base station memory module 620 may store computer-readable, computer-executable software/firmware code 625 containing instructions that are configured to, when executed, cause the base station processor module 610 to perform various functions described herein related to wireless communication. Alternatively, the computer-readable, computer-executable software/firmware code 625 may not be directly executable by the base station processor module 610 but be configured to cause the base station 605 (e.g., when compiled and executed) to perform various of the functions described herein.

The base station processor module 610 may include an intelligent hardware device, e.g., a central processing unit (CPU), a microcontroller, an ASIC, etc. The base station processor module 610 may process information received through the base station transceiver module(s) 650, the base station communications module 630, and/or the network communications module 640. The base station processor module 610 may also process information to be sent to the transceiver module(s) 650 for transmission through the antenna(s) 655, to the base station communications module 630, for transmission to one or more other base stations 105-b and 105-c, and/or to the network communications module 640 for transmission to a core network 645, which may be an example of one or more aspects of the core network 130 described with reference to FIG. 1. The base station processor module 610 may handle, alone or in connection with the directional communication module 215-c, various aspects of using known geographical information in directional wireless communications, including for searching and tracking beam directions and handovers between multiple base stations.

The base station transceiver module(s) 650 may include a modem configured to modulate packets and provide the modulated packets to the base station antenna(s) 655 for transmission, and to demodulate packets received from the base station antenna(s) 655. The base station transceiver module(s) 650 may, in some examples, be implemented as one or more base station transmitter modules and one or more separate base station receiver modules. The base station transceiver module(s) 650 may support communications in a first radio frequency spectrum band and/or a second radio frequency spectrum band. The base station transceiver module(s) 650 may be configured to communicate bi-directionally, via the antenna(s) 655, with one or more UEs or apparatuses described in FIGS. 1-5. The base station 105-*a* may, for example, include multiple base station antennas 655 (e.g., an antenna array). The base station 105-*a* may communicate with the core network 645 through the network communications module 640. The base station 105-*a* may also communicate with other base stations, such as the base stations 105-*b* and 105-*c*, using the base station communications module 630.

The directional communication module 215-*c* may be configured to perform and/or control some or all of the features and/or functions described with reference to FIGS. 2-4 in embodiments where the device 205 is a base station. For example, the directional communication module 215-*c* may include a searching module 305-*c*, a tracking module 310-*b*, and/or a handover module 315-*b*, which may perform the functions described above with reference to the respective modules 305, 310, 315 shown in FIGS. 3 and 4.

FIGS. 7A-7C illustrate several embodiments of beam forming for use in the wireless communication system 100 of FIG. 1, in accordance with various aspects of the present disclosure. As described above with reference to FIGS. 2-4, various aspects of the present disclosure may include searching for a desired beam (e.g., direction and/or width) for directional wireless communications, tracking the desired beam for directional wireless communications, and also using various beams to facilitate the handover between two different transmitters of the directional wireless communication with a receiver. The resulting beams used for the directional communication, however, may take one of many different forms. For example, as illustrated in FIG. 7A, in one example in which a base station 105-*d* is acting as a transmitter and UEs 115-*c* are acting as individual, respective receivers, a directional beam 710 may be specific to one UE 115-*c*, with other UEs 115-*c* being assigned their own respective beams, even if the other UEs 115-*c* are located closely to the one UE 115-*c*, such as in a passenger train 705. In this example, the estimated position determined by the directional communication module 215 (e.g., at operation 1105, described below in relation to FIG. 11) may be associated with the individual position of the UE 115-*c*, the desired beam direction and/or width may be relative to the individual UE 115-*c*, and so forth.

In another example, as illustrated in FIG. 7B, a directional beam 715 may encompass a number of UEs 115-*c*, which may again be positioned in close proximity to one another, such as in a passenger train 705. In this example, the estimated position determined by the directional communication module 215 (e.g., at operation 1105, described below in relation to FIG. 11) may be associated with the group of UEs 115-*c*—such as the center of the group of UEs 115-*c*, or the envelope of the group of UEs 115-*c*. Similarly, the desired beam direction and/or width may be relative to the entire group of UEs 115-*c*.

In still another example, as illustrated in FIG. 7C, a directional beam 720 may encompass an external relay module 725, which acts as an intermediary between the base station 105-*d* and the UEs 115-*c* (e.g., because the wireless communication signals cannot penetrate the passenger train 705). As mentioned briefly above, and as shown in FIG. 7C, the external relay module 725 is coupled via a wired connection to an internal relay module 730 within a passenger train 705. The external relay module 725 receives DL transmissions from the base station 105-*d* for the UEs 115-*c* (e.g., via millimeter wave and/or LTE technology), and passes these DL transmissions to the internal relay module 730, which relays them to the appropriate UE 115-*c* (e.g., via the same or a different RAT). Similarly, the internal relay module 730 receives UL transmissions from the UEs 115-*c*, and passes these UL transmissions to the external relay module 725, which relays them to the base station 105-*d*. In this manner, the base station 105-*d* can be in wireless communication with the UEs 115-*c*, even if the UEs 115-*c* are enclosed within a passenger train or other structure that may limit the penetration of the wireless communication transmissions from the base station 105-*d*. It will be appreciated that while a passenger train 705 is shown in FIG. 7C, the relay modules 725, 730 may generally be used in any situation, including those with structures that obstruct or reduce penetration of wireless communication signals.

Referring still to FIG. 7C, in this example, the estimated position determined by the directional communication module 215 (e.g., at operation 1105, described below) may be associated with the external relay module 725. Similarly, the desired beam direction and/or width may be relative to external relay module 725.

Referring now to FIGS. 7A-7C, it will be appreciated that other beam configurations are also contemplated, and, in general, the operations described above with reference to the device 205 in FIGS. 2-5 may be carried out relative to any appropriate beam configuration.

Figure 8A:
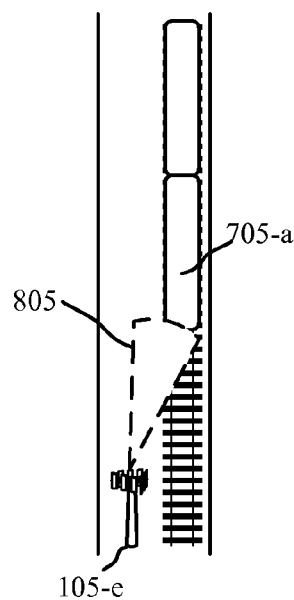
FIGS. 8A and 8B illustrate embodiments of beam searching based at least in part on known geographical information, in accordance with various aspects of the present disclosure.
Figure 8B:
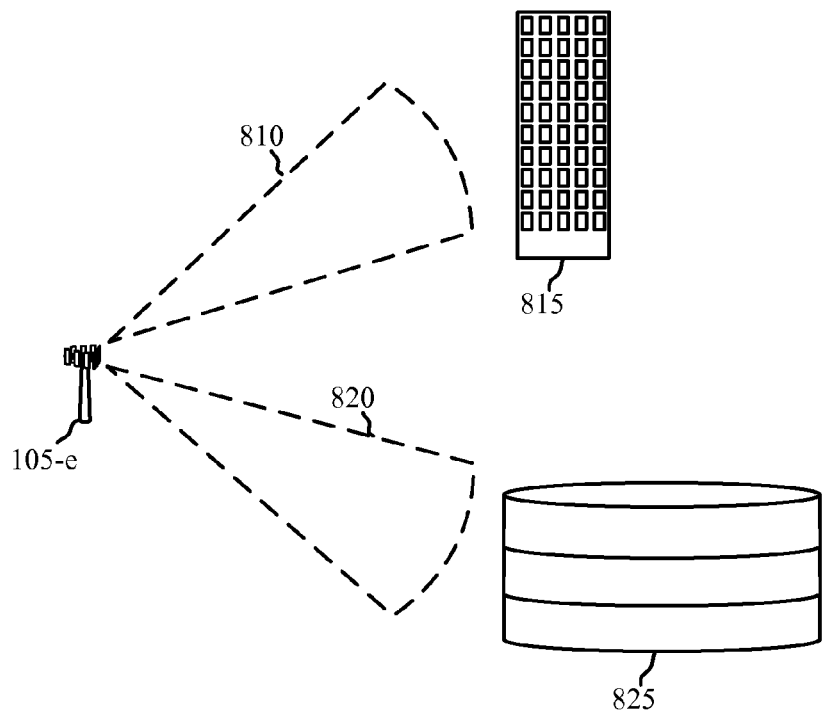

FIGS. 8A and 8B illustrate embodiments of beam searching (e.g., by the searching module 305 in FIG. 3) for use in the wireless communication system 100 of FIG. 1, in accordance with various aspects of the present disclosure. Turning first to the diagram 800-*a* in FIG. 8A, a transmitter, such as base station 105-*e*, may need to transmit DL communications to one or more receivers (not shown) positioned in a passenger train 705-*a*. As shown in FIG. 8A, the passenger train may be passing through a tunnel (e.g., a subway-type system). In accordance with the present disclosure, the transmitter/base station 105-*e* may determine an estimated position of the receiver(s) relative to itself based at least in part on known geographical information. For example, the base station 105-*e* may use the known geometry of the train tracks and tunnel, a report of the location of the train obtained from the core network 130, or generally any type of geographical information to estimate the position of the receiver(s) in the train 705-*a*. The base station 105-*e* may also search for a desired beam direction for directional wireless communication (e.g., DL transmissions) from the base station 105-*e* to the receiver(s) based at least in part on the estimated position of the receiver(s) in some embodiments. For example, the base station 105-*e* may begin beam searching in a certain direction based on the estimated position, and limit the searching over a certain subset of possible directions (as illustrated by the beam sweep 805 in FIG. 8A), instead of conducting a comprehensive beam search over all possible directions. By constraining the beam search based at least in part on the estimated position of the receivers and/or using the known geographical information, the base station 105-*e* may conserve time and frequency resources that otherwise may be required to perform a comprehensive beam search.

The diagram 800-*b* in FIG. 8B illustrates another application of using known geographical information to constrain a beam search. In FIG. 8B, a large office building 815 and a sports arena 825 may be within the range of a base station 105-*e*. The base station 105-*e* may utilize known geographical information to constrain beam searching, as described above. For example, the base station 105-*e* may use historical information indicating that a large concentration of UEs are present in an office building 815 at a particular radial offset from the base station 105-*e* during weekdays, but that few if any UEs are present in the office building 815 during the weekend. Accordingly, the base station 105-*e* may carry out a beam search (indicated by beam sweep 810) towards the direction of the office building 815 during a weekday. On the weekend, however, the base station 105-*e* may instead begin its beam search in a different direction, such as towards a sports arena (indicated by beam sweep 820). In this manner, geographical information including historical information may be used to help reduce the complexity of a beam search carried out by the base station 105-*e*.

Figure 9A:
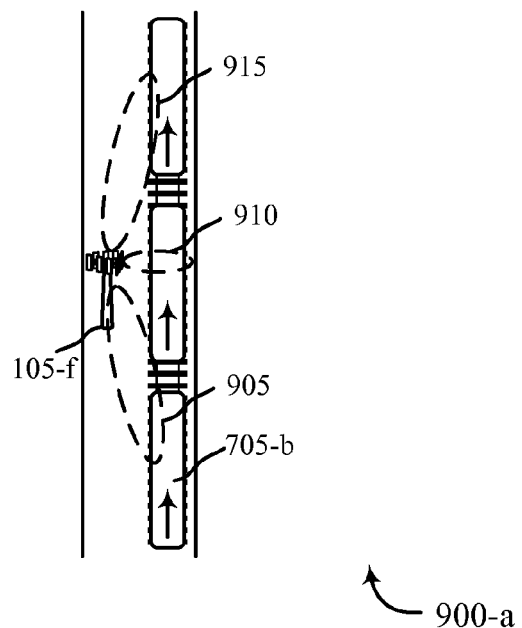
FIGS. 9A and 9B illustrate embodiments of beam tracking based at least in part on known geographical information, in accordance with various aspects of the present disclosure.
Figure 9B:
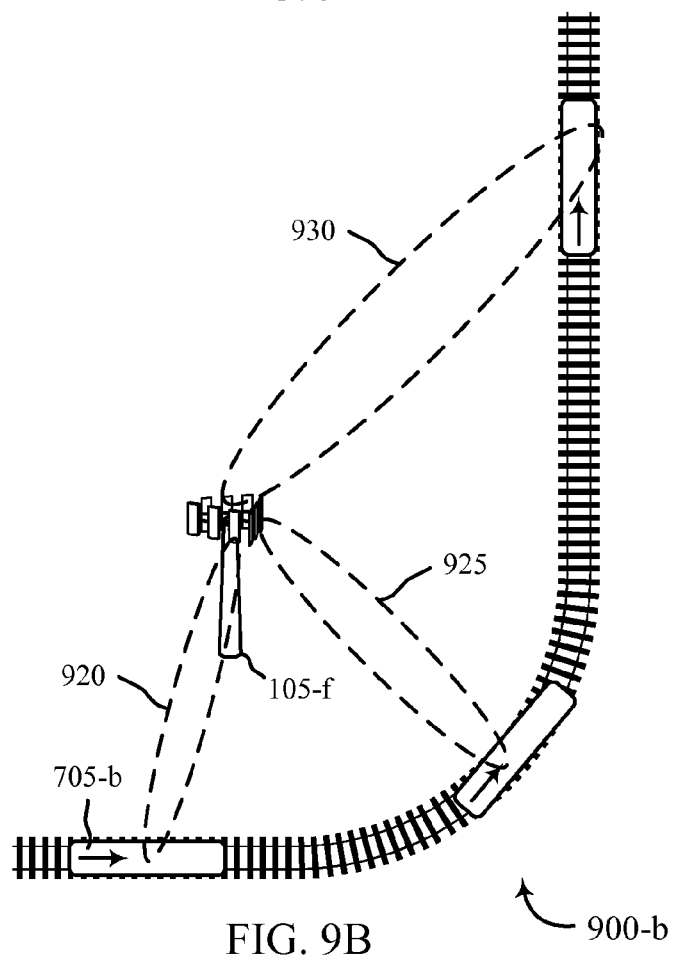

FIGS. 9A and 9B illustrate embodiments of beam tracking (e.g., by the tracking module 310 in FIG. 3) for use in the wireless communication system 100 of FIG. 1, in accordance with various aspects of the present disclosure. In FIG. 9A, a passenger train 705-*b* is passing through a tunnel in the direction indicated by the arrows (towards the top of the page). As the passenger train 705-*b* moves relative to the base station 105-*f*, a beam 905 used for directional communication with one or more receivers in the passenger train 705-*b* may need to be tracked and adjusted. As such, and as described above with reference to the tracking module 310 in FIG. 3, the base station 105-*f* may track the desired beam direction based at least in part on the known geographical information. For example, the base station 105-*f* may determine a second (future) estimated position of the receiver(s) in the passenger train 705-*b* at a second (future) time based at least in part on a current velocity of the receiver(s), a current position of the receiver(s), and a known trajectory of the receiver(s) on the passenger train 705-*b*. The second (future) estimated position may then be used by the base station 105-*f* to adjust the initial beam 905 to move with the receiver(s) on the passenger train 705-*b*, as illustrated in FIG. 9A by subsequent beams 910, 915.

FIG. 9B is similar to FIG. 9A, except that the passenger train 705-*b* carrying the receivers is not in a tunnel but on an above-ground track. As such, the base station 105-*f* may be able to track the receivers around a corner and adjust the beams 920, 925, 930 accordingly.

FIGS. 10A-10D illustrate an embodiment of handing-over wireless communication (e.g., by the handover module 315 in FIG. 3 as implemented in various transmitters and/or receivers) for use in the wireless communication system 100 of FIG. 1, in accordance with various aspects of the present disclosure. FIGS. 10A-10D show the progression of passenger train 705-*c* along a track within a tunnel as communication with one or more receivers on the passenger train 705-*c* is handed off from a first base station 105-*g*-1 to a second base station 105-*g*-2, and then to a third base station 105-*g*-3.

In FIG. 10A, the receiver(s) on the passenger train 705-*c* are being served by a beam from the first base station 105-*g*-1. The second base station 105-*g*-2 may be listening for a wake up signal from the first base station 105-*g*-1 along a receive beam direction associated with a known position of the first base station 105-*g*-1 relative to the second base station 105-*g*-2. Similarly, the third base station 105-*g*-3 may be listening for a wake up signal from the second base station 105-*g*-2 along a receive beam direction associated with a known position of the second base station 105-*g*-2 relative to the third base station 105-*g*-3. Still referring to FIG. 10A, the first base station 105-*g*-1 may transmit the wake up signal and information regarding the receiver(s) currently being served by the first base station 105-*g*-1 to the second base station 105-*g*-2 along a transmit beam direction associated with a known position of the second base station 105-*g*-2 relative to the first base station 105-*g*-1. The first base station 105-*g*-1 may also transmit a notifying signal to the receiver(s) on the passenger train 705-*c* with information regarding the second base station 105-*g*-2, including the handoff time.

Turning next to FIG. 10B, the second base station 105-*g*-2 may search for a desired beam direction based at least in part on the information regarding the receiver received from the first base station 105-*g*-1, and the receiver(s) on the passenger train may listen for a synchronization signal from the second base station 105-*g*-2 based at least in part on the information regarding the second base station 105-*g*-2 received from the first base station 105-*g*-1. Once the second base station 105-*g*-2 acquires a connection with the receiver (s) on the passenger train, the first base station 105-*g*-1 may cease communicating with the receiver(s), and may optionally tunnel buffered data destined for the receivers through the second base station 105-*g*-2.

Figure 10D:
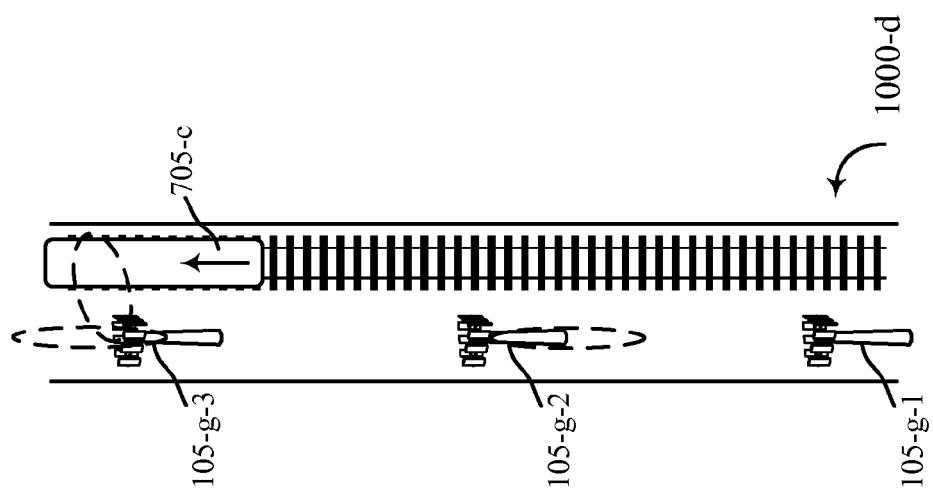
Figure 10C:
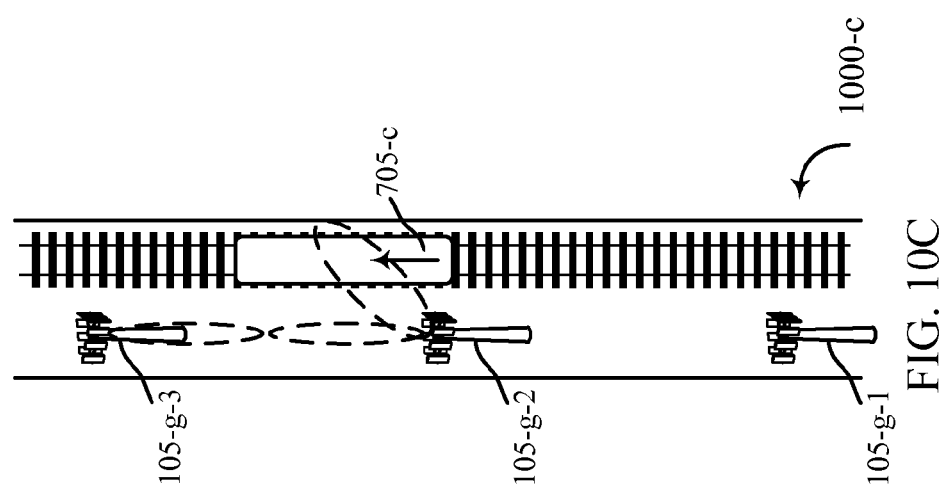

Turning next to FIGS. 10C and 10D, as the passenger train 705-*c* continues to advance, another handoff between the second base station 105-*g*-2 and the third base station 105-*g*-3 occurs in substantially the same manner as that described with reference to FIGS. 10A and 10B.

Referring now to FIGS. 8A, 9A, 9B, and 10A-10D, it will be appreciated that while reference has been made to embodiments in which one or more receivers (e.g., UEs 115) are moving on a passenger train, the teachings of this disclosure may equally be applied in other contexts in which the receivers move during operation (such as on a commercial airline flight, on sidewalks, on highways and other streets, within buildings, etc.), and also in contexts in which the receivers do not move but are stationary (see, e.g., FIG. 8B).

Figure 11:
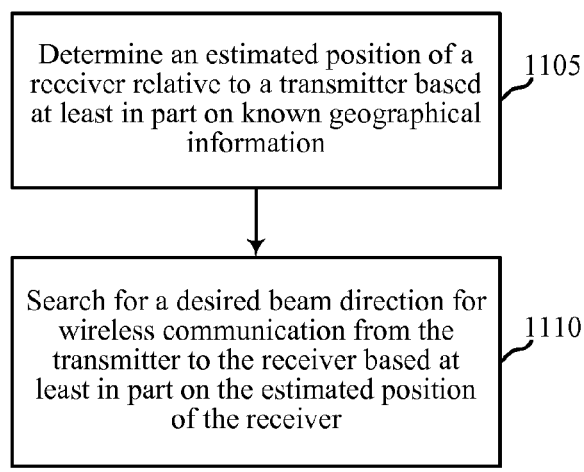
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the devices 205, transmitters, receivers, base stations 105, and/or UEs 115 described herein. In some examples, a transmitter, such as a base station 105, may execute one or more sets of codes to control the functional elements of the base station to perform some or all of the method 1100. In other examples, the transmitter may be a UE 115, and may execute one or more sets of code to implement some or all of the method 1100. In still other examples, the core network 130 in FIG. 1 may perform some or all of the method 1100.

At block 1105, the method 1100 may include determining an estimated position of a receiver (e.g., a UE 115) relative to a transmitter (e.g., a base station 105) based at least in part on known geographical information. The operation at block 1105 may be performed using the position estimation submodule 405 described above with reference to FIG. 4.

At block 1110, the method 1100 may include searching for a desired beam direction for (DL) wireless communication from the transmitter to the receiver based at least in part on the estimated position of the receiver determined at block 1105. The desired beam direction may be a transmit beam direction along which the transmitter transmits the transmissions to the receiver, or may be a receive beam direction along which the receiver receives the transmissions from the transmitter. The operation at block 1110 may be performed using the beam direction searching sub-module 410 described above with reference to FIG. 4.

Thus, the method 1100 may provide for wireless communication. It should be noted that the method 1100 is just one implementation and that the operations of the method 1100 may be rearranged or otherwise modified such that other implementations are possible. For example, operations similar to those in method 1100 may be carried out to search for a desired beam direction for (UL) wireless communications from the receiver back to the transmitter in some embodiments. Also, as described above with reference to FIG. 7, the desired beam direction may be define with respect to an individual receiver, a collective group of receivers, a relay structure on a passenger train including one or more receivers, and so forth.

Figure 12:
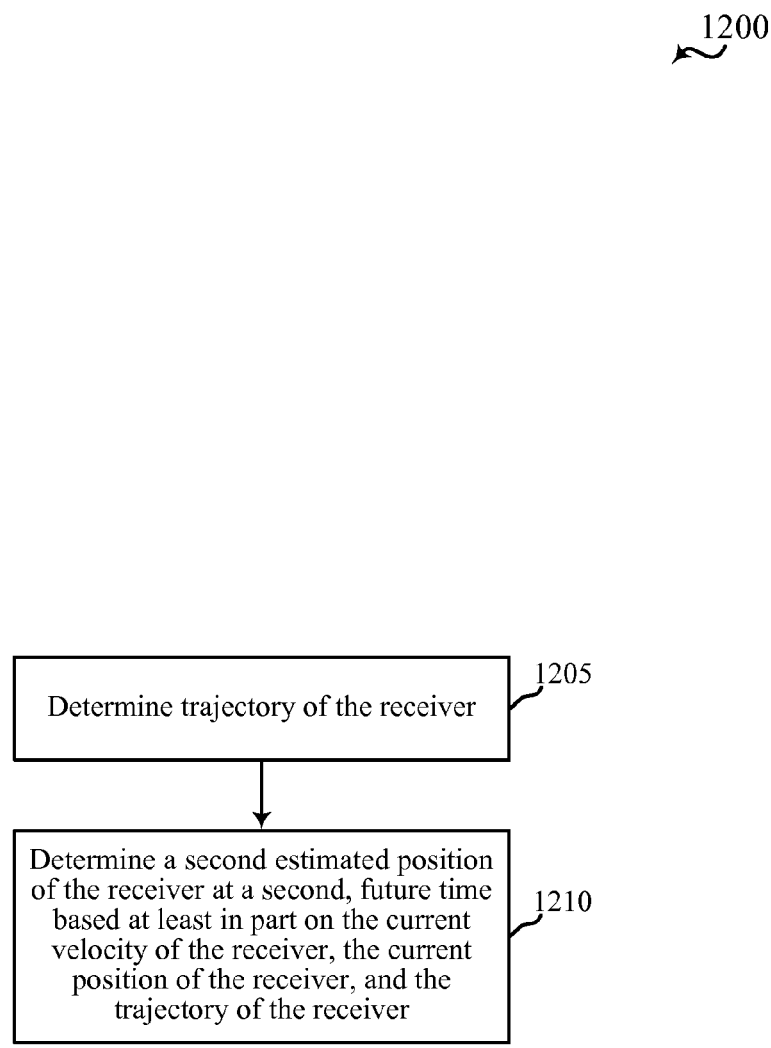
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the devices 205, transmitters, receivers, base stations 105, and/or UEs 115 described herein. In some examples, a transmitter, such as a base station 105, may execute one or more sets of codes to control the functional elements of the base station to perform some or all of the method 1200. In other examples, the transmitter may be a UE 115, and may execute one or more sets of code to implement some or all of the method 1200. In still other examples, the core network 130 in FIG. 1 may perform some or all of the method 1200.

At block 1205, the method 1200 may include determining a trajectory of the receiver. The operation at block 1205 may be performed using the trajectory sub-module 450 described above with reference to FIG. 4.

At block 1210, the method 1200 may include determining a second estimated position of the receiver at a second, future time based at least in part on the current velocity of the receiver, the current position of the receiver, and the trajectory of the receiver determined at block 1205. The operation at block 1210 may be performed using the future position estimation sub-module 415 described above with reference to FIG. 4.

Thus, the method 1200 may provide for wireless communication. It should be noted that the method 1200 is just one implementation and that the operations of the method 1200 may be rearranged or otherwise modified such that other implementations are possible. For example, while method 1200 generally relates to tracking a desired transmission beam direction for DL transmissions from a transmitter to a receiver, operations similar to those in method 1200 may be carried out to track a desired transmission beam direction for UL transmissions from the receiver to the transmitter, and/or to track desired receive beam directions for UL and/or DL transmissions.

Figure 13:
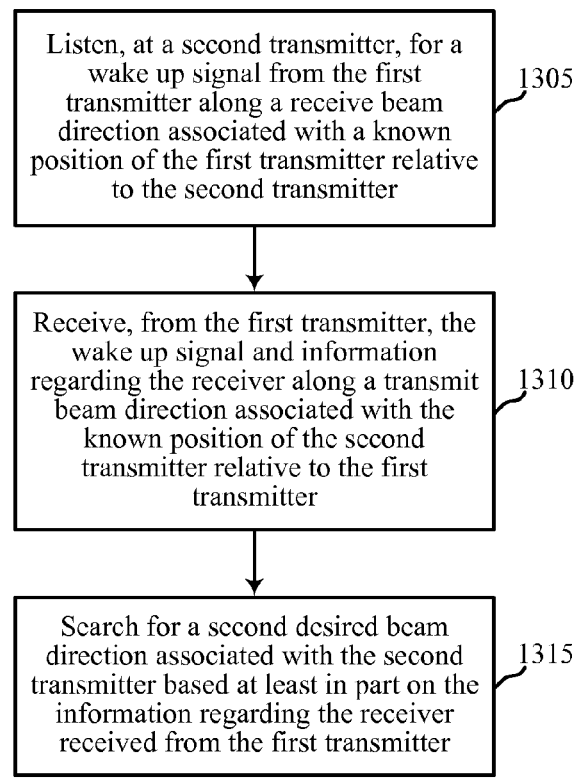
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the devices 205, transmitters, receivers, base stations 105, and/or UEs 115 described herein. In some examples, a transmitter, such as a base station 105, may execute one or more sets of codes to control the functional elements of the base station to perform some or all of the method 1300. In other examples, the transmitter may be a UE 115, and may execute one or more sets of code to implement some or all of the method 1300. In still other examples, the core network 130 in FIG. 1 may perform some or all of the method 1300. In general the method 1300 relates to handing-over wireless communications with a receiver from a first transmitter to a second transmitter At block 1305, the method 1300 may include listening, at the second transmitter, for a wake up signal from the first transmitter along a receive beam direction associated with a known position to the first transmitter relative to the second transmitter. At block 1310, the method 1300 may include receiving, from the first transmitter the wake up signal and information regarding the receiver, the first transmitter sending the wake up signal and the information regarding the receiver along a transmit beam direction associated with the known position of the second transmitter relative to the first transmitter. At block 1315, the method 1300 may include searching for a second desired beam direction associated with the second transmitter based at least in part on the information regarding the receiver received from the first transmitter. The operations at blocks 1305-1315 may, in this example, be performed using the listening sub-module 420 described above with reference to FIG. 4.

Thus, the method 1300 may provide for wireless communication. It should be noted that the method 1300 is just one implementation and that the operations of the method 1300 may be rearranged or otherwise modified such that other implementations are possible. For example, while the method 1300 illustrated in FIG. 13 has described the handover procedure from the perspective of a second transmitter to which wireless communication with a receiver is being handed off from a first transmitter, it will be appreciated that corresponding operations may be carried out for the first transmitter and for the receiver.

In some examples, aspects from two or more of the methods 1100, 1200, 1300 may be combined. It should be noted that the methods 1100, 1200, 1300 are just example implementations, and that the operations of the methods 1100, 1200, 1300 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
determining an estimated position of a receiver relative to a transmitter based at least in part on known usage of a geographical area for wireless communication;
searching over a subset of possible directions for a desired beam direction for wireless communication from the transmitter to the receiver based at least in part on the estimated position of the receiver; and
steering a transmission beam to the receiver based at least in part on the searching.

2. The method of claim 1, further comprising:
constraining the searching for the desired beam direction based at least in part on the estimated position of the receiver.

3. The method of claim 1, further comprising:
determining an estimated location of the transmitter relative to the receiver based at least in part on the known usage of the geographical area for wireless communication; and
searching for a second desired beam direction for wireless communication from the receiver to the transmitter based at least in part on the estimated location of the transmitter.

4. The method of claim 1, wherein one or more of the transmitter, the receiver, or a core network determines the estimated position, and/or determines an initial beam direction and an initial beam range for use in the searching based at least in part on the known usage of the geographical area for wireless communication.

5. The method of claim 4, further comprising:
constraining the determination of the estimated position and/or the determination of the initial beam direction and initial beam range based at least in part on the known usage of the geographical area for wireless communication.

6. The method of claim 5, wherein the determination of the initial beam direction is constrained to a predetermined subset of possible directions.

7. The method of claim 1, further comprising:
tracking the desired beam direction as a function of time during the wireless communication based at least in part on the known usage of the geographical area for wireless communication.

8. The method of claim 7, wherein the estimated position of the receiver is a first estimated position of the receiver at a first, current time, and the tracking the desired beam direction comprises:
determining a second estimated position of the receiver at a second, future time based at least in part on a current velocity of the receiver, a current position of the receiver, and a known trajectory of the receiver.

9. The method of claim 8, wherein the known trajectory of the receiver is estimated based at least in part on historical information, and the historical information comprises actual movement of other receivers during previous time periods.

10. The method of claim 8, wherein the known trajectory of the receiver is estimated based at least in part on known geographical features.

11. The method of claim 1, wherein the transmitter is a first transmitter, further comprising:

handing-over the wireless communication from the first transmitter to a second transmitter utilizing the known usage of the geographical area for wireless communication.

12. The method of claim 11, wherein the desired beam direction is a first desired beam direction associated with the first transmitter, and the handing-over of the wireless communication comprises:
listening, at the second transmitter, for a wake up signal from the first transmitter along a receive beam direction associated with a known position of the first transmitter relative to the second transmitter; and
receiving, from the first transmitter, the wake up signal and information regarding the receiver, the wake up signal and information regarding the receiver being sent by the first transmitter to the second transmitter along a transmit beam direction associated with a known position of the second transmitter relative to the first transmitter.

13. The method of claim 12, further comprising:
searching for a second desired beam direction associated with the second transmitter based at least in part on the information regarding the receiver received from the first transmitter.

14. The method of claim 12, wherein the information regarding the receiver comprises one or more of an identification number of the receiver, a current position of the receiver, a current velocity of the receiver, a suggested beam search direction, or a handoff time, and the information regarding the second transmitter comprises one or more of an identification number of the second transmitter, a known location of the second transmitter, or the handoff time.

15. The method of claim 12, further comprising:
transmitting buffered data from the first transmitter to the second transmitter for delivery to the receiver.

16. The method of claim 1, wherein the known usage of the geographical area for wireless communication comprises one or more of a current location of the receiver, a current velocity of the receiver, current channel measurements by the receiver, historical information, or a known trajectory of the receiver.

17. The method of claim 1, wherein the wireless communication comprises uplink and/or downlink transmissions.

18. The method of claim 1, wherein the wireless communication is in a millimeter wave frequency band.

19. The method of claim 1, wherein the transmitter comprises a base station, and the receiver is a user equipment (UE) or a relay module.

20. The method of claim 19, wherein the receiver moves during the wireless communication.

21. The method of claim 1, wherein the transmitter comprises a user equipment (UE) or a relay module, and the receiver is a base station.

22. The method of claim 1, wherein the receiver is one of a group of receivers, and the estimated position is determined for the collective group of receivers relative to the transmitter.

23. An apparatus for wireless communication, comprising:
means for determining an estimated position of a receiver relative to a transmitter based at least in part on known usage of a geographical area for wireless communication;
means for searching over a subset of possible directions for a desired beam direction for wireless communication from the transmitter to the receiver based at least in part on the estimated position of the receiver; and
means for steering a transmission beam to the receiver based at least in part on the searching.

24. The apparatus of claim 23, further comprising:
means for constraining the searching for the desired beam direction based at least in part on the estimated position of the receiver.

25. The apparatus of claim 23, further comprising:
means for determining an estimated location of the transmitter relative to the receiver based at least in part on the known usage of the geographical area for wireless communication; and
means for searching for a second desired beam direction for wireless communication from the receiver to the transmitter based at least in part on the estimated location of the transmitter.

26. The apparatus of claim 23, further comprising:
means for tracking the desired beam direction as a function of time during the wireless communication based at least in part on the known usage of the geographical area for wireless communication.

27. An apparatus for wireless communication, comprising:
a processor;
memory in electronic communication with the processor; and
instructions stored in the memory, the instructions being executable by the processor to:
determine an estimated position of a receiver relative to a transmitter based at least in part on known usage of a geographical area for wireless communication;
search over a subset of possible directions for a desired beam direction for wireless communication from the transmitter to the receiver based at least in part on the estimated position of the receiver; and
steer a transmission beam to the receiver based at least in part on the searching.

28. The apparatus of claim 27, wherein the memory further comprises instructions being executable by the processor to:
determine an estimated location of the transmitter relative to the receiver based at least in part on the known usage of the geographical area for wireless communication; and
search for a second desired beam direction for wireless communication from the receiver to the transmitter based at least in part on the estimated location of the transmitter.

29. A non-transitory computer-readable medium for wireless communication in a wireless device, the non-transitory computer-readable medium storing computer-executable code for:
determining an estimated position of a receiver relative to a transmitter based at least in part on known usage of a geographical area for wireless communication;
searching over a subset of possible directions for a desired beam direction for wireless communication from the transmitter to the receiver based at least in part on the estimated position of the receiver; and
steering a transmission beam to the receiver based at least in part on the searching.

30. The non-transitory computer-readable medium of claim 29, further storing computer-executable code for:

determining an estimated location of the transmitter relative to the receiver based at least in part on the known usage of the geographical area for wireless communication; and searching for a second desired beam direction for wireless communication from the receiver to the transmitter based at least in part on the estimated location of the transmitter.

\* \* \* \* \*